United States Patent Office 2,744,659
Patented May 8, 1956

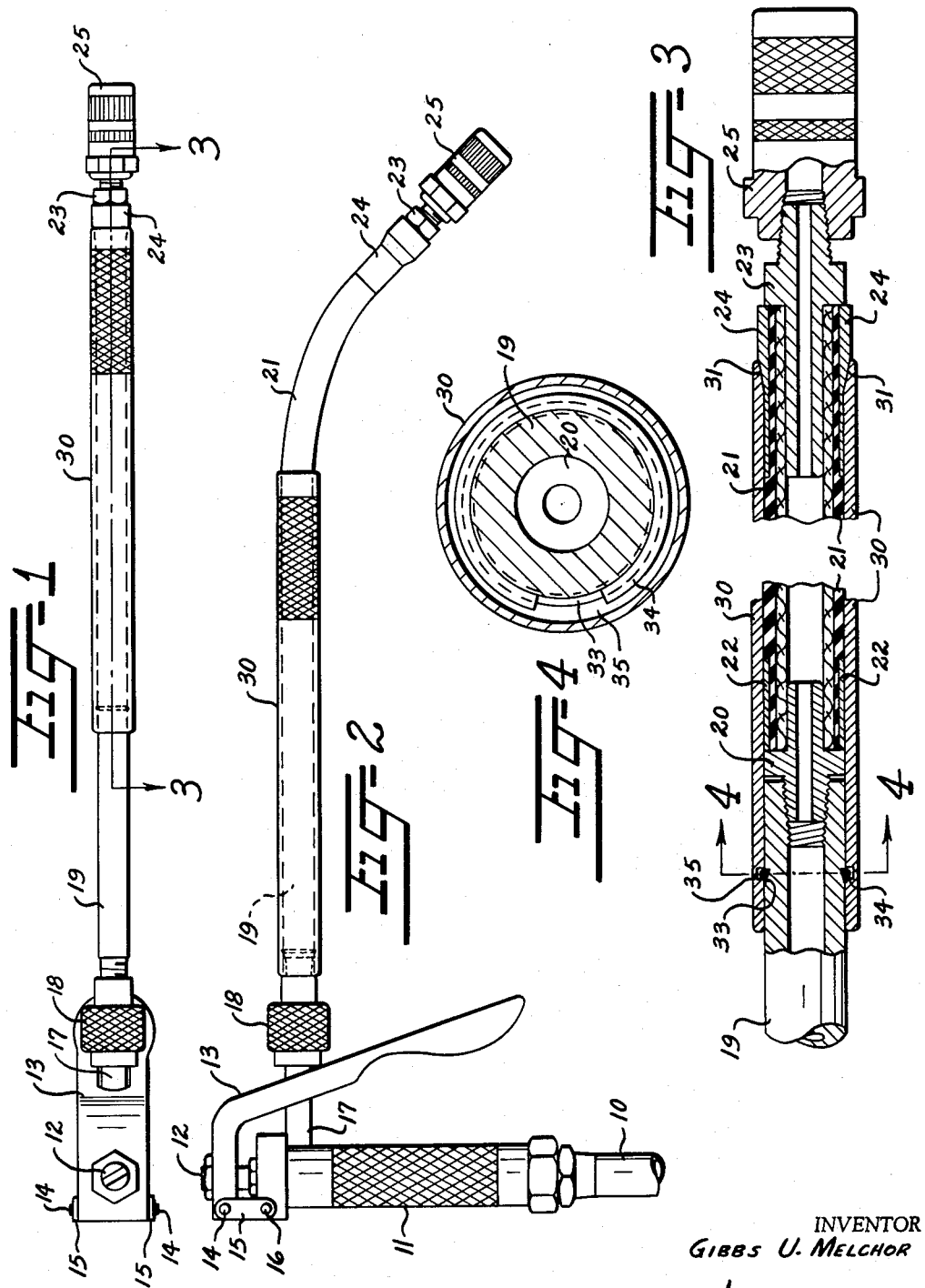

2,744,659
GREASE GUN NOZZLE

Gibbs U. Melchor, Mooresville, N. C.

Application April 8, 1954, Serial No. 421,902

8 Claims. (Cl. 222—125)

This invention relates to lubrication apparatus and more especially to a lubrication nozzle or grease gun adapted to be secured to the control valve which is placed on the end of a discharge hose coming from a pressure lubricating device.

Heretofore it has been difficult to reach inaccessible places where grease fittings have been placed and it has been almost impossible to reach these grease fittings with the coupling on the end of the discharge pipe. It is an object of this invention to provide a grease gun with a discharge nozzle associated with the discharge valve having a flexible portion which can be directed by the hand of an operator to any desired angle whereby the coupling on the free end thereof can be placed against a fitting and when the apparatus is being used for lubricating a fitting that is easily accessible, a slidable member can be slid up over the flexible portion of the discharge apparatus to lend rigidity to the same so that pressure can be applied to the apparatus to force it into contact with the fitting. Pressure can be applied, by the hand of an operator holding the control valve, to the coupling on the end of the apparatus to force it into engagement with the grease fitting to force lubricating material into the grease fitting.

It is another object of this invention to provide lubrication apparatus wherein a rigid pipe is connected to the hand control valve on the end of the pressure hose conveying the lubricant and this rigid pipe has a flexible pipe connected to the free end thereof. The free end of the flexible pipe has a hydraulic coupling connected thereto and slidably mounted on the rigid pipe and the flexible pipe is a slidable pipe having means for locking it in position when it is slid to where its outer end will firmly engage the flexble pipe at its junction with the coupling on the end of the flexible pipe to thereby lend rigidity to the same for ordinary lubrication of easily accessible grease fittings. On the other hand, when access is desired to a fitting which is not easily accessible, then the slidable pipe can be slid back to expose the flexible pipe and the flexible pipe can be manipulated by the hand of the operator into a position where the hydraulic coupling thereof can be forced into engagement with the grease fitting.

Some of the objects of the invention having been stated, other objects will appear as the description proceeds, when taken in connection with the accompanying drawings, in which—

Figure 1 is a top plan view of the apparatus in rigid condition;

Figure 2 is a side elevation of the apparatus looking at the lower side of Figure 1 but showing the slidable pipe retracted to expose the flexible pipe;

Figure 3 is an enlarged longitudinal sectional view of a portion of the apparatus taken substantially along the line 3—3 in Figure 1, with parts broken away;

Figure 4 is an enlarged transverse sectional view taken along the line 4—4 in Figure 3.

Referring more specifically to the drawings, the numeral 10 indicates one end of a flexible hose which has its other end connected to a pressure lubrication apparatus, not shown, and on the discharge end of the flexible hose 10 is mounted a hand control valve 11 which has a plunger 12 controlling the opening and closing of the valve within the valve housing 11 and this plunger 12 is controlled by a hand lever 13 which is pivoted as at 14 to links 15 which, in turn, are pivoted to the valve housing as at 16. Connected to a discharge port of the valve housing 11 is a pipe 17 which, by means of a coupling 18, has connected thereto a first rigid pipe 19. The other end of the pipe 19 is threaded onto a coupling 20 to which is secured one end of a flexbile hose 21 by means of a confining ring 22. This flexible hose 21 is connected at its other end to a coupling 23 by means of a confining ring 24, the couplings 20 and 23 having passageways therethrough for the passage of lubricant in entering and leaving the flexible pipe 21. The coupling 23 has threadably secured thereto a hydraulic coupling 25 which is adapted to fit over a grease fitting, not shown, to deliver a lubricant to the grease fitting.

Slidably mounted for axial movement relative to the rigid pipe 19 and the flexible pipe 21 is a second rigid reinforcing pipe or member 30 which has an outwardly tapered interior surface 31 adjacent the coupling 23. The first pipe 19 adjacent the hand control valve housing 11 is provided with a peripheral groove 33 in which a snap ring 34 is seated and the second pipe 30 on its interior has an inner peripheral groove 35 so that, when the pipe 30 is in the position shown in Figure 1, the snap ring 34 will engage the grooves 33 and 35 and hold the pipe 30 in the position shown in Figure 1. The wall of groove 33 nearest the hand control valve 11 is sloping to tend to latch the parts in the position shown in Figure 1. In this position the operator, by manipulating the hand control valve and the assembly just described, can engage the hydraulic coupling 25 with a grease fitting and apply pressure to the same to hold it in rigid contact with the grease fitting to force lubricant into the grease fitting when the lever 13 is moved to open position.

Now, in case a grease fitting is difficult to reach with a rigid device such as with the parts in the position shown in Figure 1, the operator can seize the slidable pipe 30 and exert sufficient pressure to overcome the gripping action of the snap ring 34 to allow the lefthand end of the rigid pipe 30 in Figures 1 and 2 to be moved to the position shown in Figure 2.

Then the operator, by holding the control valve in one hand and seizing the flexible pipe 21 with the other hand, can manipulate the hydraulic coupling to where it will be engaged with a grease fitting and hold it in such engaging position until lubricant is passed through the mechanism and forced into the grease fitting. When the parts are moved from the position shown in Figure 1 to the position shown in Figure 2, the right-hand shoulder of cavity 35 will engage the snap ring 34 and cause the snap ring to ride over the sloping wall of the groove 33 and thus the snap ring will be expanded into groove 35 and will be carried along the pipe 19.

It is thus seen that I have provided a lubrication apparatus which is suitable not only for easily accessible grease fittings but which can be quickly adjusted to make a portion of the same bendable and thus make it easy to gain access to a grease fitting which is located in a shielded or difficult position.

In the drawings and specification there has been set forth a preferred embodiment of the invention and although specific terms are employed, they are used in a generic and descriptive sense only, and not for pur-

I claim:

1. In a lubrication apparatus having a hand control valve and a first rigid pipe extending therefrom, said first rigid pipe having a flexible pipe fixedly connected to the free end thereof and the flexible pipe having a hydraulic coupling connected to the free end thereof; the combination of a second rigid pipe slidably mounted on the first rigid pipe and being movable longitudinally of the first rigid pipe to encase the flexible pipe to lend rigidity thereto during a lubrication procedure and said second rigid pipe being movable longitudinally of the first rigid pipe to expose the flexible pipe whereby the flexible pipe can be manipulated to cause the hydraulic coupling thereon to be engaged with a grease fitting.

2. In a lubrication apparatus having a hand control valve and a first rigid pipe extending therefrom, said first rigid pipe having a flexible pipe fixedly connected to the free end thereof and the flexible pipe having a hydraulic coupling connected to the free end thereof; the combination of a second rigid pipe slidably mounted on the first rigid pipe and being movable longitudinally of the first rigid pipe to encase the flexible pipe to lend rigidity thereto during a lubrication procedure, said second rigid pipe being movable longitudinally of the first rigid pipe to expose the flexible pipe whereby the flexible pipe can be manipulated to cause the hydraulic coupling thereon to be engaged with a grease fitting, and means for releasably latching the second rigid pipe to the first rigid pipe when the second rigid pipe is moved to encase the flexible pipe.

3. In a lubrication apparatus having a hand control valve and rigid discharge pipe extending therefrom, said rigid pipe having a flexible pipe fixedly connected to the discharge end thereof and the flexible pipe having a hydraulic coupling connected to the discharge end thereof, a rigid member slidably mounted on the rigid pipe and being movable longitudinally of the rigid pipe and the flexible pipe to lend rigidity to the flexible pipe during a lubrication procedure and said rigid member being movable in a reverse direction longitudinally of the rigid pipe to expose the flexible pipe whereby the flexible pipe can be manipulated to cause the hydraulic coupling thereon to be engaged with a grease fitting.

4. In a lubrication apparatus having a hand control valve and rigid discharge pipe extending therefrom, said rigid pipe having a flexible pipe fixedly connected to the discharge end thereof and the flexible pipe having a hydraulic coupling connected to the discharge end thereof; the combination of a rigid member slidably mounted on the rigid pipe and being movable longitudinally of the rigid pipe and the flexible pipe to lend rigidity to the flexible pipe during a lubrication procedure, said rigid member being movable in a reverse direction longitudinally of the rigid pipe to expose the flexible pipe whereby the flexible pipe can be manipulated to cause the hydraulic coupling thereon to be engaged with a grease fitting, and means for releasably latching the rigid member to the rigid discharge pipe when the rigid member has been moved to where the flexible pipe is exposed.

5. In a lubrication apparatus having a hand control valve and a rigid pipe communicating with the hand control valve and extending therefrom, said rigid pipe having a flexible pipe connected to the discharge end thereof and the flexible pipe having a hydraulic coupling connected to the discharge end thereof; the combination of a reinforcing member slidably mounted on the rigid pipe and being movable to extended position to encase the flexible pipe to lend rigidity thereto during a lubrication procedure and said reinforcing member being movable longitudinally of the rigid pipe towards the hand control valve to expose the flexible pipe whereby the flexible pipe can be manipulated to cause the hydraulic coupling thereon to be engaged with a grease fitting.

6. In a lubrication apparatus having a hand control valve and a rigid pipe communicating with the hand control valve and extending therefrom, said rigid pipe having a flexible pipe connected to the discharge end thereof and the flexible pipe having a hydraulic coupling connected to the discharge end thereof; the combination of a reinforcing member slidably mounted on the rigid pipe and being movable to extended position to encase the flexible pipe to lend rigidity thereto during a lubrication procedure, said reinforcing member being movable longitudinally of the rigid pipe towards the hand control valve to expose the flexible pipe whereby the flexible pipe can be manipulated to cause the hydraulic coupling thereon to be engaged with a grease fitting, and means for releasably latching the reinforcing member in extended position.

7. In a lubrication apparatus having a hand control valve and a first rigid pipe extending therefrom, said first rigid pipe having a flexible pipe connected to the free end thereof and the flexible pipe having a hydraulic coupling connected to the free end thereof; the combination of a second rigid pipe slidably mounted on the first rigid pipe and being movable longitudinally of the first rigid pipe to extended position to encase the flexible pipe to lend rigidity thereto during a lubrication procedure and said second rigid pipe being movable longitudinally of the first rigid pipe to expose the flexible pipe whereby the flexible pipe can be manipulated to cause the hydraulic coupling thereon to be engaged with a grease fitting.

8. In a lubrication apparatus having a hand control valve and a first rigid pipe extending therefrom, said first rigid pipe having a flexible pipe connected to the free end thereof and the flexible pipe having a hydraulic coupling connected to the free end thereof; the combination of a second rigid pipe slidably mounted on the first rigid pipe and being movable longitudinally of the first rigid pipe to extended position to encase the flexible pipe to lend rigidity thereto during a lubrication procedure, said second rigid pipe being movable longitudinally of the first rigid pipe to expose the flexible pipe whereby the flexible pipe can be manipulated to cause the hydraulic coupling thereon to be engaged with a grease fitting, and releasable means for latching the second rigid pipe in extended position.

References Cited in the file of this patent

UNITED STATES PATENTS

| 172,929 | Newton | Feb. 1, 1876 |
| 1,466,677 | Sundh | Sept. 4, 1923 |
| 1,733,441 | Barks | Oct. 29, 1929 |
| 1,905,455 | Fesler | Apr. 25, 1933 |

FOREIGN PATENTS

| 2,929 | Great Britain | July 18, 1876 |